June 29, 1926.
P. J. DONOVAN
VAPOR CLOSET
Filed Dec. 7, 1925
1,590,289
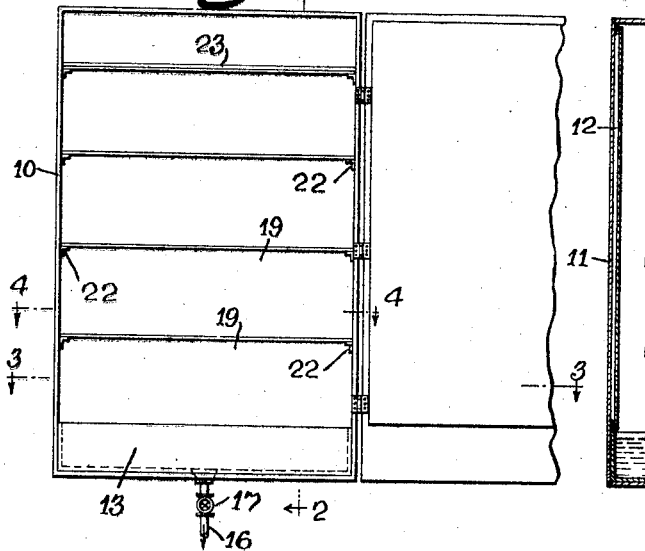
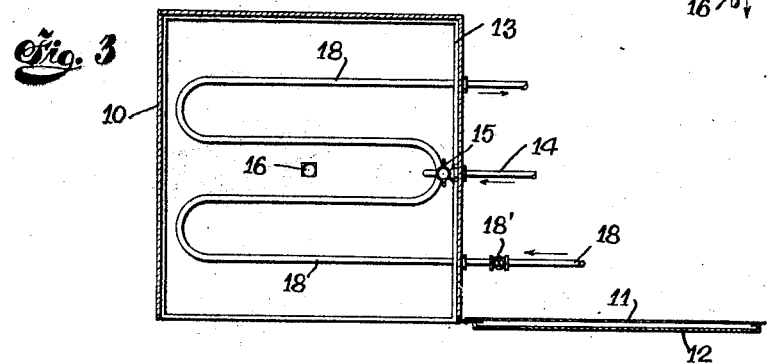
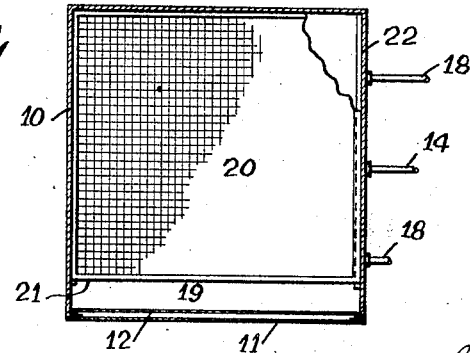
INVENTOR.
Patrick J. Donovan.
BY Ramsey Hoguet,
ATTORNEY.

Patented June 29, 1926.

1,590,289

UNITED STATES PATENT OFFICE.

PATRICK J. DONOVAN, OF NEW YORK, N. Y.

VAPOR CLOSET.

Application filed December 7, 1925. Serial No. 73,682.

My invention relates to improvements in vapor closets, and the object of my invention is to produce a cheap, simple, and substantially portable closet which can be easily installed in churches and the like, and is especially adapted and intended for use in tempering altar or communion bread. This bread usually comes in very thin sheets, and when used is cut into small pieces or wafers. Because of the thinness of the slices of the bread, it can not be cut to advantage, and is very crumbly unless it is moistened or tempered to prevent this. Very many expedients have been used for tempering the bread, but these have not been satisfactory because the methods are usually inconvenient and take a good deal of time. My invention is intended to produce a structure which is cleanly and sanitary, and which will act very quickly to temper or moisten a large quantity of such bread.

Reference is to be had to the accompanying drawings forming a part of this specification, in which similar reference characters indicate corresponding parts in all the views.

Figure 1 is a broken front elevation of the vapor closet embodying my invention, showing the same open.

Figure 2 is a cross section of the closed closet on the line 2—2 of Figure 1.

Figure 3 is a sectional plan on the line 3—3 of Figure 1, and

Figure 4 is a broken sectional plan on the line 4—4 of Figure 1.

The closet and its accessories should be made of material which does not readily rust, and it comprises a body box-like portion 10, which is closed by a suitable door 11, a hinged door being illustrated, and the body portion of the door is double as shown at 12 leaving an air space which serves in a measure as an insulator and prevents too rapid precipitation on the door. The lower portion of the door is left single so as to close snugly against the evaporating pan 13 which fills the bottom of the closet and which is preferably formed as a part of the closet and is not removable, although it may be removable if preferred, but I find it an advantage to have the pan a part of the closet, so that when the device as a whole is installed it will be sure to be in working condition and have all its parts so that they are not likely to become disarranged.

The pan is provided with a water supply pipe 14 controlled by a valve 15, and it has a drain pipe 16 controlled by a valve 17. The water in the pan is preferably heated by a steam pipe 18 which is formed into coils within the pan, and which enters through the side, the pipe being controlled by a valve 18'.

The closet is also provided with a series of superposed shelves 19 spaced apart one above the other, each shelf having preferably a body of wire mesh 20 with a suitable binding 21, and the shelves rest on ledges 22 or the like which are attached to opposite side walls of the interior of the closet. These shelves are removable, and they are preferably arranged as shown in Figure 2 so as not to extend quite to the front of the closet and thus leave a space for the vapor to rise freely and to pass in between the several shelves, although obviously it will rise through the wire mesh shelves and pass through the bread slices thereon, tempering these as it does so.

The top shelf is preferably provided with a pad 23 of absorbent material to prevent water precipitation from dropping from the top of the closet and injuring the bread, and such droppings will be absorbed by the pad, while any precipitation on the sides will trickle down to the pan 13 without injuring the bread.

It will be seen that by this simple structure it is possible to put a very substantial quantity of bread slices on the shelves, and then by turning on the steam and raising the temperature of the water, the latter vaporizes, and the amount of vaporizing can be controlled by regulating the steam flow. It will be obvious that in this way the bread can be tempered in a few minutes, whereas by the ordinary methods a great deal of time is necessary, and moreover the means disclosed for permitting the vapor to permeate all parts of the closet tempers the bread in a better way than any method with which I am familiar.

It will be noted that this structure is quite different from a humidifier, as the moistening of the air is not dependent on the natural and slight evaporation of liquid, but that it has means for quickly vaporizing, and that such means is entirely within control.

I claim:—

1. A vapor closet comprising a box-like body having a closing door, a pan in the bottom of the closet, a controllable heating medium for water in the pan, a series of superposed spaced bread carrying shelves above the pan, said shelves having their forward edges spaced apart from the door to provide circulation for vapor and an absorbent pad in the upper part of the closet.

2. A vapor closet comprising a box-like body, a door for the body, a pan in the closet bottom, a heating medium for water in the pan, a series of superposed spaced bread carrying shelves, and an absorbent pad in the upper part of the closet.

In testimony whereof, I have signed my name to this specification this 23d day of October, 1925.

PATRICK J. DONOVAN.